Patented Feb. 1, 1938

2,107,159

UNITED STATES PATENT OFFICE 2,107,159

IMPROVED COLORING MATERIAL

Thomas A. Martone, Wilmington, Del., assignor to E. I. du Pont de Nemours & Company, Wilmington, Del., a corporation of Delaware No Drawing. Application November 30, 1934, Serial No. 755,415

10 Claims. (Cl. 134—58)

This invention relates to improved pigments, lakes and toners and more particularly refers to a process for producing insoluble coloring material in a much more desirable form than was heretofore possible.

Heretofore pigments, lakes and toners have been subject to numerous disadvantages. For example, they have been harsh and compact. Upon grinding or drying the yield was appreciably lowered and the cost of the resulting products increased considerably. Light fastness of the resulting compounds was also frequently far from satisfactory. The strength, shade and texture of these compounds were also unsatisfactory in many instances. Upon drying these prior art products tended to form hard, gritty particles and thereby decrease the strength of the dry compound. When these products were used in the manufacture of printing inks grit and hard particles had to be completely eliminated to prevent destruction of the printing plates. In the production of rubber colors it was also essential that such grit and hard particles be completely removed, particularly when the colors were imparted to thin articles.

It is known that preformed pigments may be treated with certain alcohol derivatives prior to incorporation into the materials to be colored. However, so far as I am aware it has never been suggested that the alcohol derivatives described hereafter might advantageously be used in producing such pigments. Since my invention is directed to the formation of these insoluble coloring materials it is quite distinct from treatment of such materials after they are formed. The advantages of this invention cannot be obtained by such after treatment, and the compounds so treated while their characteristics may be somewhat improved are, nevertheless, appreciably inferior to those produced in accordance with my invention.

It is an object of this invention to produce pigments, lakes and toners which are soft and fluffy in texture. A further object is to produce insoluble coloring materials which have pronounced strength and light fastness. A still further object is to avoid the defects previously enumerated with respect to prior art pigments, lakes and toners. Additional objects will become apparent from a consideration of the following description and claims.

These objects are attained according to the herein described invention which comprises forming pigments, lakes and toners in the presence of a sulfonated organic compound containing the radical of a higher alcohol. In a more restricted sense this invention is directed to the formation of superior coloring materials by producing said materials in the presence of a water-soluble salt of a sulfonated alcohol containing at least 8 carbon atoms. In its preferred embodiment the present invention comprises the formation of pigments, lakes and toners in the presence of a water-soluble salt of a sulfuric acid ester of a normal primary alcohol containing from 12 to 18 carbon atoms, and particularly in the presence of a water-soluble salt of an unsaturated alcohol which has been acetylated prior to sulfonation.

This invention may be more readily understood by a consideration of the following illustrative examples which, for convenience, are divided into the following classes:

I. Inorganic—
  1. Lemon yellow chrome lake
  2. Iron blue
II. Organic—
  1. Azo—
    (a) Direct coupling forming insoluble product
      (1) Lithosol red C-sodium salt (bronze orange)
      (2) Toluidine toner (MNPT + beta naphthol)
      (3) B - naphthol - 2 - amino - naphthalene-1-sulfonic acid
    (b) Soluble dye to insoluble salt in presence of inorganic base
      (1) Lithosol rubine BLM CI–183
      (2) Dye corresponding to CI–151
  2. Triphenyl methane—
    (a) Basic dye to tannic acid lake
      (1) Dye corresponding to CI–729
    (b) Basic dye to phospho tungstic-molybdic toner
      (1) Dye from tetramethyl - diamino - diphenyl - ethyl - alpha - naphthyl-methane
    (c) Acid dye to insoluble salt
      (1) Brilliant blue E CI–671
  3. Vat colors—
    (a) Indigoid and thioindigoid
      (1) Indigo CI–1177
      (2) Sulfanthrene pink FB CI–1211
    (b) Anthraquinone
      (1) Ponsol blue GD CI–1113
  4. Sulfur colors—
    (a) Sulfogene blue BXN CI–959

EXAMPLE 1

Lemon Yellow Chrome Lake

Lower tub

| | Grams |
|---|---|
| Lead oxide | 30 |
| Acetic acid (56%) | 11 |
| Sodium sulfate salt of acetylated technical oleyl alcohol | 2 |
| Sodium bichromate | 9.5 |
| Sulfuric acid (66%) | 8 |

Add the acetic acid in 780 cc. of water, heat to 40° C. and sift in the lead oxide, stir for 2 hours, cool with ice, then add—

Top tub 9.5 grams of sodium bichromate that has been dissolved in 300 cc. of water. Make the volume of sodium bichromate up to 1000 cc., then add ice and cool to zero. Then add the 8 grams of sulfuric acid to the sodium bichromate. As soon as the sulfuric acid has been added, drop the sulfuric-bichromate solution into the lower tub containing the lead-acetic solution.

The results showed greater strength, and the texture of the chrome yellow was different than the product produced in the absence of sulfonated alcohols.

EXAMPLE 2

Iron Blue

Unit 1

66 grams ferrous sulfate (100%) in 700 cc. water

Unit 2

75 grams potassium ferrocyanide dissolved in 1000 cc. water

Add:

4 grams sodium sulfate salt of acetylated technical oleyl alcohol

Cool to 20° C.

Unit 3

1000 cc. water

Run the solution from Unit 1 and Unit 2 into Unit 3 at the same time over a period of 30 minutes. Dilute to 4000 cc. Wash 5 to 6 times, heat to boil. Then oxidize with 44 grams ferric chloride that has been dissolved in 200 cc. water. Wash, filter and dry.

EXAMPLE 3

Bronze Orange

Upper side tub 221 lbs. lithosol Red C base (2-chlor-5-toluidine-4-sulfonic acid)
2500 lbs. water Paste thoroughly and add:

42.5 lbs. sodium hydroxide

Heat to 158° F. Stir until completely dissolved. Then drop into upper tub containing:

6800 lbs. ice
1000 lbs. water

Agitate, then add:

90 lbs. hydrochloric acid 100%

Stir 2 minutes, then drop the Red C base (2-chlor-5-toluidine-4-sodium sulfonate) from the upper side tub to the upper tub during 5 minutes. Agitate 5 minutes, then add:

69 lbs. sodium nitrite 100% dissolved in 690 lbs. water

Temperature is zero. Diazotize 15 minutes. At the end of the diazotization there should be a positive test toward starch iodide papers.

Lower tub 150 lbs. beta-naphthol
700 lbs. water
70 lbs. caustic soda

Dissolve the beta-naphthol at 75° F. in caustic and stir until beta is completely dissolved. Add an additional 2500 lbs. of water. Then add:

30 lbs. sodium sulfate salt of acetylated technical oleyl alcohol

Dilute in 250 lbs. water. Stir 15 minutes after sulfonated alcohol is added to the beta-naphthol and cool to 70° F.

Coupling

Drop the diazo from the upper tub to the lower tub during a period of 5 minutes. Stir one hour and test for uncoupled diazo by taking a spot from the coupling and test with a strong alkaline solution of H acid. Test should be negative and show no uncoupled diazo. Coupling is alkaline to brilliant yellow paper. Stir 24 hours, heat to 180° F. during 15 minutes, stir one hour, filter and wash to a slight alkalinity to brilliant yellow paper. Dry at 110° F. over night.
Yield 395 to 398 lbs.

By using sulfonated alcohol the following advantages are obtained:

1. Lighter mass tones
2. Greater strength
3. Much more bronze
4. More consistent results
5. More foolproof than method without sulfonated alcohol. While masstone and strength may vary the necessary bronze is obtained when using sulfonated alcohol
6. Color is more stable to drying
7. The coupling will not foam in the tub as does the straight coupling without sulfonated alcohol
8. Also, the color can be repeated with 3.5% more sulfonated alcohol after filtering and increase the original bronze
9. 3% alkali may be added to the color before drying and a high finished bronze obtained

EXAMPLE 4

Meta-nitro-para-toluidine coupled with beta-napthol (toluidine toner)

7.5 parts meta-nitro-para-toluidine (Lithosol Scarlet Base M) pasted in 7.5 parts water. Dilute with 175 parts water. Cool to 32° F. Add:

18.25 parts hydrochloric acid (30%) and
3.6 parts sodium nitrite (100%) dissolved in 36 parts water. Diazotize 1 hour. Add:
6.75 parts sodium acetate (100%) dissolved in 67.5 parts water

Beta-naphthol 7.6 parts beta-naphthol (100%)
2.25 parts caustic soda (100%) dissolved in 22.5 parts water
2.65 parts soda ash (100%) dissolved in 26.5 parts water. Dissolve and add 1000 parts water at 90° F. Add:
1.0 part sodium sulfate salt of acetylated technical oleyl alcohol Add the diazo to the naphthol solution. Stir one hour. Wash; filter and dry.

The addition of sulfonated alcohol to the coupling of meta-nitro-para-toluidine and beta-naphthol produces a toner darker in masstone, more bronzy, much yellower in shade and much stronger than the straight coupling.

1.2 parts sodium sulfate salt of technical lauryl alcohol substituted for the 1.0 part of corresponding salt of acetylated technical oleyl alcohol also produces a toner darker in masstone, more bronzy, yellower in shade and stronger than the straight coupling. The addition of this sulfonated lauryl alcohol gives a toner slightly lighter in masstone, bluer in shade, and slightly weaker than the toner with sulfonated oleyl acetate.

*Properties.*—Alcohol bleeding—straight coupling—bleeds with orange coloration. Coupling with sodium sulfate salt of acetylated technical oleyl alcohol bleeds slightly less than straight coupling. Coupling with sodium sulfate salt of technical lauryl alcohol bleeds slightly less than straight coupling and equal to coupling with sulfonated oleyl acetate.

*Advantages.*—The sodium sulfate salt of acetylated technical oleyl alcohol used in toluidine toner produces a product impossible to make with the straight coupling in use at the present time. This is a great advantage as the finished toner is entirely different physically from the straight toner and when made into printing ink has a high glossy finish. The strength is also greatly improved making the color of greater value than the present types of toluidines.

EXAMPLE 5

BETA - NAPHTHOL-2-AMINO - NAPHTHALENE-1-SULFONIC ACID

Tub 1

30 grams beta-naphthol (100%)
10 grams caustic soda (100%)

Dissolve the beta-naphthol in the caustic soda by heating to 140° F. Add 400 cc. water, making total volume of 500 cc. Cool this solution to 32° F. with ice. Add enough ice to keep this temperature constant throughout the coupling. To the naphthol solution add 40 grams acetic acid (99.5%) and 71.1 grams hydrochloric acid (37.5%). Add the acetic acid, then after stirring a few minutes add the hydrochloric acid. Agitate 5 minutes. Add 6 grams sodium sulfate salt of acetylated technical oleyl alcohol.

Tub 2

45.0 grams 2-amino-naphthalene-1-sulfonic acid is dissolved in
8.8 grams caustic soda (10% solution in water) and 250 cc. hot water Make up volume to about 800 cc. After cooling with ice to 32° F. Add:

13.8 grams sodium nitrite (10% solution in water) to the cooled 2-amino-naphthalene-1-sulfonic acid solution

Combining 1 and 2

Add the 2-amino-naphthalene-1-sulfonic acid solution at 32° F. slowly to the beta-naphthol suspension at 32° F. Test for sodium nitrite (should be a slight excess by test to starch iodide). Diazotize from 3–5 minutes holding temperature at 32° F. Then add with a medium rapidity:

30 grams caustic soda (10% solution in water) at 68° F. (100%). Follow immediately by
60 grams barium chloride (10% solution in water) at 68° F. as rapidly as possible. Agitate 10 minutes. Heat to 170° F. slowly. Dilute with water. Stir 4 hours. Wash twice, filter and dry at 130° F.

The coupling with sulfonated alcohol is softer in texture, possesses greater depth of masstone, is slightly yellower in shade and shows an increase of approximately 10% in strength.

EXAMPLE 6

LITHOSOL RUBINE BLM POWDER CI–183

5 parts lithosol rubine BLM powder suspend in 1000 parts water. Add:
1 part sodium sulfate salt of acetylated technical oleyl alcohol. Heat to 200° F. Hold for 3 minutes. Add:
10 parts acetic acid diluted with 100 parts water. Add base made as follows:
20 parts alum dissolved in 200 parts water at 200° F.
10 parts soda ash dissolved in 100 parts water at 100° F. Wash free of sulfates. Make volume up to 400 parts. Precipitate at 140° F. during 4 minutes with
4 parts calcium chloride dissolved in 40 parts cold water. Stir one hour, filter and dry.

The above formula gives a finished lake that is softer than the straight precipitation, is yellower in masstone, yellower in shade and equal in strength. The lake containing sulfonated alcohol bleeds less in alcohol than the straight precipitation and is non-bleeding in water and oil.

1.2 parts of the sodium sulfate salt of technical lauryl alcohol may be substituted for the 1 part of sulfonated oleyl acetate and gives a lake equal in softness, slightly lighter in masstone, slightly bluer in shade and equal in strength to the straight precipitation.

The lake containing sulfonated lauryl alcohol is darker in masstone, and much bluer in shade than the lake containing sulfonated oleyl acetate. It bleeds very slightly more in alcohol than the lake containing sulfonated oleyl acetate and slightly less than the straight precipitation.

EXAMPLE 7

DYE CORRESPONDING TO CI–151

10.0 parts alum in 100 parts water at boil
5.0 parts soda ash in 50 parts water at 100° F. Wash free of sulfates. Make volume up to 200 parts with water. Add:
3.0 parts dye corresponding to CI–151 dissolved in 150 parts hot water to which has been added
0.5 part sodium sulfate salt of acetylated technical oleyl alcohol. Precipitate at 150° F. by adding during 5 minutes
3.0 parts barium chloride dissolved in 30 parts water at 150° F. Stir 15 minutes. Wash, filter and dry.

0.6 part sodium sulfate salt of technical lauryl alcohol may be substituted for the 0.5 part of sulfonated oleyl acetate.

The addition of either of these two agents produces lakes lighter in masstone, slightly redder in shade and weaker.

The sulfonated oleyl acetate produces a soft fluffy lake, much softer than the straight lake.

EXAMPLE 8

Dye Corresponding to CI–729

1.0 gram dye corresponding to CI–729 dissolved in 100 cc. hot water
0.5 cc. glacial acetic acid. Pour onto base prepared as follows:
20.0 grams alum dissolved in 200 cc. water at 200° F.
9.0 grams soda ash dissolved in 90 cc. water at 100° F. Wash free of sulfates, make volume up to 400 cc. Stir 2 minutes. Add:
1.0 gram sodium sulfate salt of acetylated technical oleyl alcohol. Bring to and precipitate at boil with
1.5 grams tannic acid dissolved in 15 cc. cold water
0.75 gram tartar emetic dissolved in 15 cc. cold water. Boil 5 minutes, filter and dry.
1.0 gram sodium sulfate salt of technical lauryl alcohol may be substituted for the sulfonated oleyl alcohol.

Sulfonated oleyl acetate has an advantage over the straight color precipitation in that it is softer, and fluffier and has a much better texture. For use in rubber and certain types of ink a product having the above properties is essential.

EXAMPLE 9

Dye from Tetramethyl-diamino-diphenyl-ethyl-alpha-naphthyl-methane 4.0 grams above dye dissolved in 600 cc. water at the boil. Add
1.0 gram sodium sulfate salt of acetylated technical oleyl alcohol. Add the following mixture at boil
14.0 grams sodium tungstate in 200 cc. water at boil
2.0 grams sodium molybdate
2.5 grams sodium phosphate
12.8 grams hydrochloric acid (20 degrees Bé.)
Wash, filter and dry.

The phosphotungstic-molybdic toner with sulfonated alcohol is a very soft powder and is very desirable for use as a rubber color and for printing inks. Without the use of sulfonated alcohols this desirable physical form cannot be obtained, so far as is now known.

EXAMPLE 10

Lithosol Brilliant Blue E CI–671

20 parts alum dissolved in 200 parts water at 90° F.
10.0 parts soda ash dissolved in 100 parts water. Wash free of sulfates. Make volume up to 400 parts with water. Add to
1.5 parts lithosol brilliant blue E dissolved in 100 parts of water to which has been added
1.0 part sodium salt of sulfated acetylated technical oleyl alcohol. Precipitate at 90° F. with
3.0 parts barium chloride dissolved in 30 cc. water. Stir one hour, wash, filter and dry.

The addition of sulfonated alcohol produces a very fluffy powder and is weaker in masstone, greener and brighter in shade and weaker on reduction than the straight precipitation. However, the lake containing sulfonated alcohol has a greater yield.

The addition of 1.2 parts sodium sulfate salt of technical lauryl alcohol in place of the sulfonated acetylated oleyl alcohol gives practically the same masstone and shade but is weaker than the lake containing sulfonated oleyl acetate.

EXAMPLE 11

Indigo CI–1177

(a) 20 grams of 20% paste synthetic indigo and 5 cc. 31° Bé. caustic soda are diluted to a volume of 50 cc. heated to 60° C. and reduced by the addition of 1.5 grams sodium hydrosulfite. After the reduction is complete, water containing 1 gram of the sodium salt sulfated acetylated technical oleyl alcohol is added to give a total volume of 300 cc. Air is blown through the solution at 50° C. until the leuco indigo is completely oxidized. After separation and drying, a product is obtained which is softer, fluffier and has a much better texture, making it more suitable for use in rubber, inks, etc. than the product obtained without the use of sulfated acetylated technical oleyl alcohol.

(b) Same as above (a) except 1.25 grams sodium salt of sulfated technical lauryl alcohol (mixture of lauryl and myristyl alcohols). Here again, improved results were obtained.

(c) An improved pigment can be obtained by adding 1 part sulfated technical cetyl alcohol (based on indoxyl) to the diluted indoxyl solution resulting from the fusion of phenyl glycine with caustic, and oxidizing as usual, with air, sodium hypochlorite or other oxidizing agents.

EXAMPLE 12

Sulfanthrene Pink FB CI–1211

1 gram of sulfanthrene pink FB double powder and 3 cc. 31° Bé. caustic soda are diluted to a volume of 200 cc., heated to 70° C. and reduced by the addition of 1.5 grams sodium hydrosulfite. After the reduction is complete water containing 0.15 gram of the sodium salts of sulfated acetylated technical oleyl alcohol is added to give a total volume of 400 cc. Air is blown through the solution at 60° C. until the leuco form of the dye is completely oxidized. After separation and drying, a product is obtained of improved physical properties for use as a pigment.

EXAMPLE 13

Ponsol Blue GD CI–1113

4 grams of ponsol blue GD paste and 8 cc. 31° Bé. caustic soda are diluted to a volume of 200 cc. heated to 50° C. and reduced by the addition of 1.5 grams sodium hydrosulfite. After the reduction is complete, water containing 0.5 gram of the sodium salt of sulfated acetylated technical oleyl alcohol is added to give a total volume of 400 cc. Air is blown through the solution at 50° C. until the leuco form of the dye is completely oxidized. After separation and drying, a product is obtained which is softer, fluffier and has a much better texture, making it more suitable for use as a pigment.

EXAMPLE 14

Sulfogene Blue BXN CI–959

5 grams sulfogene blue BXN, 6 grams sodium sulfide, 3 grams soda ash and 10 cc. water are mixed and heated to 100°, then 340 cc. water containing 1 gram sodium salt sulfated acetylated technical oleyl alcohol are added. Air is blown through the solution until the dye is completely precipitated. After separation and drying a product is obtained which is softer, fluffier and has a much better texture than obtained without the use of sulfated acetylated technical oleyl alcohol.

It is understood that the aforementioned examples are illustrative merely of the practical methods of carrying out the instant invention. These examples are not intended as a limitation upon the scope of the invention, since the reactants and the conditions of reaction may be varied within wide limits without departing from the scope of this invention. For example, in place of the various pigments, lakes and toners previously enumerated or in admixture therewith other insoluble coloring materials may be produced. The particular method of producing such coloring materials may likewise vary in accordance with the class from which such materials are selected. All prior art processes for producing pigments, lakes and toners are contemplated as coming within the scope of this invention when modified by conducting such processes in the presence of sulfonated organic compounds containing the radical of a higher alcohol. Such sulfonated organic compound may be added to any one of the constituents or to the reaction mixture prior to formation of the ultimate insoluble coloring material.

Sulfonated organic compounds which are capable of use herein are exceedingly numerous and may be used either alone, in admixture with one another and/or in admixture with assistants previously used in the prior art for producing pigments, lakes and/or toners. These compounds must, in general, contain the radical of a higher alcohol. The particular alcohol, the radical of which is contained in such compound, may be selected from various classes such as the aliphatic, hydrocyclic or aralkyl series. Most satisfactory results are, in general, obtained by selecting normal primary alcohols having at least 8 carbon atoms and preferably from 12 to 18 carbon atoms in the molecule. Alcohols coming within the aforementioned category are: octyl, decyl, lauryl, myristyl, cetyl, stearyl, oleyl, ricinoleyl, linoleyl, batyl, selachyl, chimyl, etc. alcohols. The alcohols suitable for use herein may be unsaturated and/or polyhydric. Furthermore, they may contain additional substituents such as chlorine and other halogen groups, acetyalkoxy groups, acyl, borate, etc. groups. Acetylated unsaturated normal primary alcohols, in particular acetylated oleyl alcohol, have been found to give excellent results for this purpose. Such compounds may, for example, be produced by treating oleyl or other unsaturated alcohols with acetic anhydride.

The aforementioned or related alcohols may be treated with sulfonating agents such as concentrated sulfuric acid, oleum, pyridine-sulfur trioxide, sodium pyrosulfate, amino-sulfonic acid, imino-disulfonic acid, aryl sulfamic acid, and chlorsulfonic acid. In this connection, it may be mentioned that where "sulfonation" is referred to herein it is used in the generic sense to mean either the production of a sulfuric acid ester or the production of a true sulfonic acid derivative. Since sulfuric acid esters are ordinarily superior to the true sulfonic acid derivatives it is advisable to carry out the sulfonation under such conditions that they will be produced. This may frequently be accomplished by conducting the sulfonation within the temperature range of 0–50° C.

Sulfonated derivatives of the alcohols, produced in accordance with the aforementioned instructions, are advisably neutralized with salt-forming compounds. These compounds may be of either inorganic or organic origin. Examples of a few salt-forming compounds of inorganic origin are soda ash, caustic soda, ammonium hydroxide, caustic potash, oxides and hydroxides of calcium, magnesium, lithium, etc. Among the salt-forming compounds of organic origin mention may be made of the aromatic amines, quaternary ammonium bases, cyclohexylamines, mono- and di-cyclohexylamines, quarternary phosphonium bases, tertiary sulfonium bases, alicyclic hydroxy amino compounds, pyridine, piperidine, mono-, di- and tri-alkylamines, mono-, di- and tri-alkylolamines, etc.

In place of the above mentioned sulfonated alcohols or mixtures thereof additional derivatives are contemplated for use herein. For example, numerous primary alcohols previously described or their homologues may be etherified with polyhydric alcohols such as glycol, glycerol, polyglycol, polyglycerol, etc. The resulting mono- or poly-ethers should preferably, but not necessarily, contain one or more free hydroxyl groups. One or more of these free hydroxyl groups may subsequently be reacted with a sulfonating agent. Likewise, the etherifying radical may be reacted with the sulfonating agent. Examples of such compounds are sulfonated glycerol ethers of lauryl, myristyl, cetyl, stearyl, oleyl, etc. alcohols.

The amount of the sulfonated organic compound which may be used in accordance herewith may vary widely depending upon the particular coloring materials which are to be formed. In general, amounts varying from a few hundredths of one per cent to three per cent, based upon the weight of pigment, lake or toner, are satisfactory. However, it is not intended to restrict this invention to any particular amount since the optimum quantity for any given product may be easily determined by conducting a few routine experiments.

By means of the present invention pigments, lakes and toners having a soft fluffy texture are produced. The strength and light fastness of these compounds is markedly superior to those produced in accordance with prior art methods. These products are quite dissimilar physically to those heretofore known and may ordinarily be used in much smaller quantities than was previously possible. Such products have a variety of uses, for example in the production of printing inks, colored rubber materials, etc. They may be used in any of the processes wherein prior art pigments, lakes and toners have been used or are capable of use. Likewise, they may be used in admixture with prior art insoluble coloring materials.

As many apparently widely different embodiments of this invention may be made without departing from the spirit and scope thereof, it is to be understood that the invention is not limited to the specific embodiments thereof except as defined in the appended claims.

I claim:

1. A process for producing an improved water-insoluble pigment which comprises admixing aqueous solutions of two compounds which react without an oxidation step to form said pigment, one of said solutions containing a water-soluble sulfate of an acetylated, unsaturated, normal, primary alcohol having twelve to eighteen carbon atoms in the molecule and both of said solutions being free from emulsified oils.

2. A process for producing an improved water-insoluble pigment which comprises admixing an aqueous solution of an organic dyestuff or an organic dyestuff intermediate with another aqueous solution which contains a compound capable of reacting with said dyestuff or dyestuff intermediate to form said pigment without subsequent oxidation, one of said solutions containing a water-soluble sulfate of an acetylated, unsaturated, normal, primary alcohol having twelve to eighteen carbon atoms in the molecule and both of said solutions being free from emulsified oils.

3. A process for producing an improved azo pigment which comprises admixing an aqueous solution of a diazotized aryl amine with an aqueous solution of a coupling component which contains a water-soluble sulfate of an acetylated, unsaturated, normal, primary alcohol having twelve to eighteen carbon atoms in the molecule, both of said solutions being free from emulsified oils.

4. A process for producing an improved azo pigment which comprises admixing an aqueous solution containing diazotized 2-chlor-5 toluidine-4-sulfonic acid with an aqueous solution containing beta naphthol and the sodium sulfate salt of acetylated technical oleyl alcohol, both of said solutions being free from emulsified oils.

5. A process for producing an improved azo pigment which comprises admixing an aqueous solution of a diazotized aryl amine with an aqueous solution containing beta naphthol and a water-soluble sulfate of an acetylated, unsaturated, normal, primary alcohol having twelve to eighteen carbon atoms in the molecule, both of said solutions being free from emulsified oils.

6. A process for producing an improved toluidine toner which comprises admixing a solution containing diazotized meta-nitro-para-toluidine with an aqueous solution containing beta naphthol and the sodium sulfate salt of acetylated technical oleyl alcohol, both of said solutions being free from emulsified oils.

7. A process for producing an improved water-insoluble pigment which comprises admixing aqueous solutions of two compounds which react without an oxidation step to form said pigment, one of said solutions containing the sodium sulfate salt of acetylated technical oleyl alcohol and both of said solutions being free from emulsified oils.

8. A process for producing an improved water-insoluble pigment which comprises admixing an aqueous solution of an organic dyestuff or an organic dyestuff intermediate with another aqueous solution which contains a compound capable of reacting with said dyestuff or dyestuff intermediate to form said pigment without subsequent oxidation, one of said solutions containing the sodium sulfate salt of acetylated technical oleyl alcohol and both of said solutions being free from emulsified oils.

9. A process for producing an improved azo pigment which comprises admixing an aqueous solution of a diazotized aryl amine with an aqueous solution of a coupling component which contains the sodium sulfate salt of acetylated technical oleyl alcohol, both of said solutions being free from emulsified oils.

10. A process for producing an improved azo pigment which comprises admixing an aqueous solution of a diazotized aryl amine with an aqueous solution containing beta naphthol and the sodium sulfate salt of acetylated technical oleyl alcohol, both of said solutions being free from emulsified oils.

THOMAS A. MARTONE.